United States Patent
Xu et al.

(10) Patent No.: US 12,242,367 B2
(45) Date of Patent: Mar. 4, 2025

(54) FEATURE IMPORTANCE BASED MODEL OPTIMIZATION

(71) Applicant: INTERNATIONAL BUSINESS MACHINES CORPORATION, Armonk, NY (US)

(72) Inventors: Jing Xu, Xi'an (CN); Xue Ying Zhang, Xi'an (CN); Si Er Han, Xi'an (CN); Jing James Xu, Xi'an (CN); Xiao Ming Ma, Xi'an (CN); Jun Wang, Xi'an (CN); Wen Pei Yu, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 331 days.

(21) Appl. No.: 17/744,690

(22) Filed: May 15, 2022

(65) Prior Publication Data

US 2023/0367689 A1 Nov. 16, 2023

(51) Int. Cl.
*G06F 13/00* (2006.01)
*G06F 11/34* (2006.01)
*G06F 18/23* (2023.01)

(52) U.S. Cl.
CPC .......... *G06F 11/3447* (2013.01); *G06F 18/23* (2023.01)

(58) Field of Classification Search
CPC ................................................ G06F 11/3447
See application file for complete search history.

(56) References Cited

U.S. PATENT DOCUMENTS

| 2014/0136165 A1* | 5/2014 | Sarma | ................. G06Q 10/067 703/2 |
| 2015/0286704 A1* | 10/2015 | Shyr | ...................... G06F 16/35 707/737 |

FOREIGN PATENT DOCUMENTS

| CN | 108268460 A | 7/2018 |
| CN | 106897199 B | 3/2020 |
| CN | 111931009 A | 11/2020 |
| IN | 201821013348 A | 10/2019 |
| WO | 2019193570 A1 | 10/2019 |
| WO | 2020008392 A2 | 1/2020 |

OTHER PUBLICATIONS

Fang et al., "Better Model Selection with a new Definition of Feature Importance", arXiv: 2009.07708v1 [stat.ML] Sep. 16, 2020, 8 pps <https://arxiv.org/pdf/2009.07708.pdf> (hereinafter Fang). (Year: 2009).*

Interpret model predictions using Permutation Feature Importance, Oct. 21, 2021, 7 pps., Microsoft Docs, https://docs.microsoft.com/en-us/machine-learning/how-to-guides/explain-machine learning-model-permutation-feature-importance-ml-net (Year: 2021).*

(Continued)

*Primary Examiner* — Phuong Huynh
(74) *Attorney, Agent, or Firm* — Shackelford, McKinley & Norton, LLP (57) ABSTRACT

Disclosed are a computer-implemented method, a system and a computer program product for model exploration. Model feature importance of each model of a plurality of models can be obtained, the plurality of models can be grouped into a plurality of model clusters based on the model feature importance of each model, and the model feature importance can be presented by box-plot or confidence interval.

25 Claims, 8 Drawing Sheets

(56) References Cited

OTHER PUBLICATIONS

By Shah, "Using Feature Importance Rank Ensembling (Fire) for Advanced Feature Selection", DataRobot, 10pps., 2021 DataRobot, Inc., https://www.datarobot.com/blog/using-feature-importance-rank-ensembling-fire-for-advanced-feature-selection/ (Year: 2021).*

"Automated Model Nuggets", SPSS Modeler 18.2.1, 2 pps., IBM documentation, © Copyright IBM Corporation 1994, 2019, <https://www.ibm.com/docs/en/spss-modeler/18.2.1?topic=nodes-automated-model-nuggets >.

"Interpret model predictions using Permutation Feature Importance", Oct. 21, 2021, 7 pps., Microsoft Docs, <https://docs.microsoft.com/en-us/dotnet/machine-learning/how-to-guides/explain-machine-learning-model-permutation-feature-importance-ml-net>.

Chahal et al., "Prowl: Towards Predicting the Runtime of Batch Workloads", WOSP-C Workshop, CPE'18 Companion, Apr. 9-13, 2018, Berlin, Germany, 2 pps.

Fang et al., "Better Model Selection with a new Definition of Feature Importance", arXiv:2009.07708v1 [stat.ML] Sep. 16, 2020, 8 pps., <https://arxiv.org/pdf/2009.07708.pdf>.

Mell et al., "The NIST Definition of Cloud Computing", National Institute of Standards and Technology, U.S. Department of Commerce, NIST Special Publication 800-145, Sep. 2011, 7 pages.

Shah, "Using Feature Importance Rank Ensembling (Fire) for Advanced Feature Selection", DataRobot, 10 pps., © 2021 DataRobot, Inc., <https://www.datarobot.com/blog/using-feature-importance-rank-ensembling-fire-for-advanced-feature-selection/>.

U.S. Appl. No. 17/443,831, filed Jul. 28, 2021.

* cited by examiner

| | Model_ID | F1_imp | F2_imp | F3_imp | F4_imp | F5_imp | F6_imp | F7_imp | F8_imp |
|---|---|---|---|---|---|---|---|---|---|
| 1 | 32451 | .20 | .13 | .03 | .08 | | | | .15 |
| 2 | 35436 | | .16 | | | .30 | .13 | .11 | |
| 3 | 65465 | | .10 | | | .34 | .10 | .10 | |
| 4 | | | | | | | | | |
| 5 | | | | | | | | | |
| 6 | | | | | | | | | |
| 7 | | | | | | | | | |
| 8 | | | | | | | | | |
| 9 | | | | | | | | | |
| 10 | 43432 | .34 | .21 | .09 | .16 | | | | |

Cluster 1: rows 1 and 10
Cluster 2: rows 2 and 3

FIG. 8

FEATURE IMPORTANCE BASED MODEL OPTIMIZATION

BACKGROUND

The present disclosure relates generally to data mining, and more specifically, to model exploration and optimization.

With the development of machine learning techniques, many predictive models have been used to perform classification and/or other prediction tasks. In order to explore and/or optimize those predictive models, they are usually listed in tables for users to view and use.

SUMMARY

According to one embodiment of the present disclosure, there is provided a computer-implemented method for model exploration. In this method, a plurality of models are clustered by comparing their feature importance, so that predictive models with a certain degree of similarity in feature importance are grouped into same model cluster that is suitable for specific data cases, and the feature importance of a plurality of models can be presented by box-plots/confidence intervals to provide a reference for model selection.

According to one embodiment of the present disclosure, there is provided a computer-implemented method for model exploration, comprising: computing, by one or more processing units, model feature importance of each model of a plurality of models; and grouping, by one or more processing units, the plurality of models into a plurality of model clusters based on the model feature importance of each model.

According to another embodiment of the present disclosure, there is provided a system for model exploration. The system comprises one or more processors, a memory coupled to at least one of the processors and a set of computer program instructions stored in the memory. When executed by at least one of the processors, the set of computer program instructions perform following actions of obtaining model feature importance of each model of a plurality of models, and grouping the plurality of models into a plurality of model clusters based on the model feature importance of each model.

According to a yet another embodiment of the present disclosure, there is provided a computer program product for model exploration. The computer program product comprises a non-transitory computer readable storage medium having program instructions embodied therewith. The program instructions executable by a processor to cause the processor to obtain model feature importance for each model of a plurality of models, and group the plurality of models into a plurality of model clusters based on the model feature importance of each model.

According to a yet another embodiment of the present disclosure, there is provided a computer-implemented method for optimizing models. The method may comprise obtaining, by one or more processing units, a model feature importance of each model of a plurality of models. The method may further comprise grouping, by the one or more processing units, the plurality of models into a plurality of model clusters based on the model feature importance of each model. The method may further comprise presenting, on a display device, the plurality of model clusters. The method may further comprise computing, by the one or more processing units, a data feature importance for a data case by applying a preliminary model; and automatically selecting, by the one or more processing units, a model cluster for the data case from the plurality of model clusters, based on similarity between the data feature importance and a cluster feature importance of each model cluster of the plurality of model clusters. The cluster feature importance of each model cluster may be based at least in part on the model feature importance of at least one model included in corresponding model cluster.

According to a yet another embodiment of the present disclosure, there is provided a system for optimizing models, comprising one or more processors, a memory coupled to at least one of the processors; a set of computer program instructions stored in the memory, which, when executed by the one or more processors, cause the one or more processors to perform a method. The method may comprise obtaining model feature importance of each model of a plurality of models, and grouping the plurality of models into a plurality of model clusters based on the model feature importance of each model. The method may further comprise computing data feature importance for a data case by applying a preliminary model, and automatically selecting a model cluster for the data case from the plurality of model clusters, based on similarity between the data feature importance and cluster feature importance of each model cluster of the plurality of model clusters. The cluster feature importance of each model cluster may be based at least in part on the model feature importance of at least one model included in corresponding model cluster.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
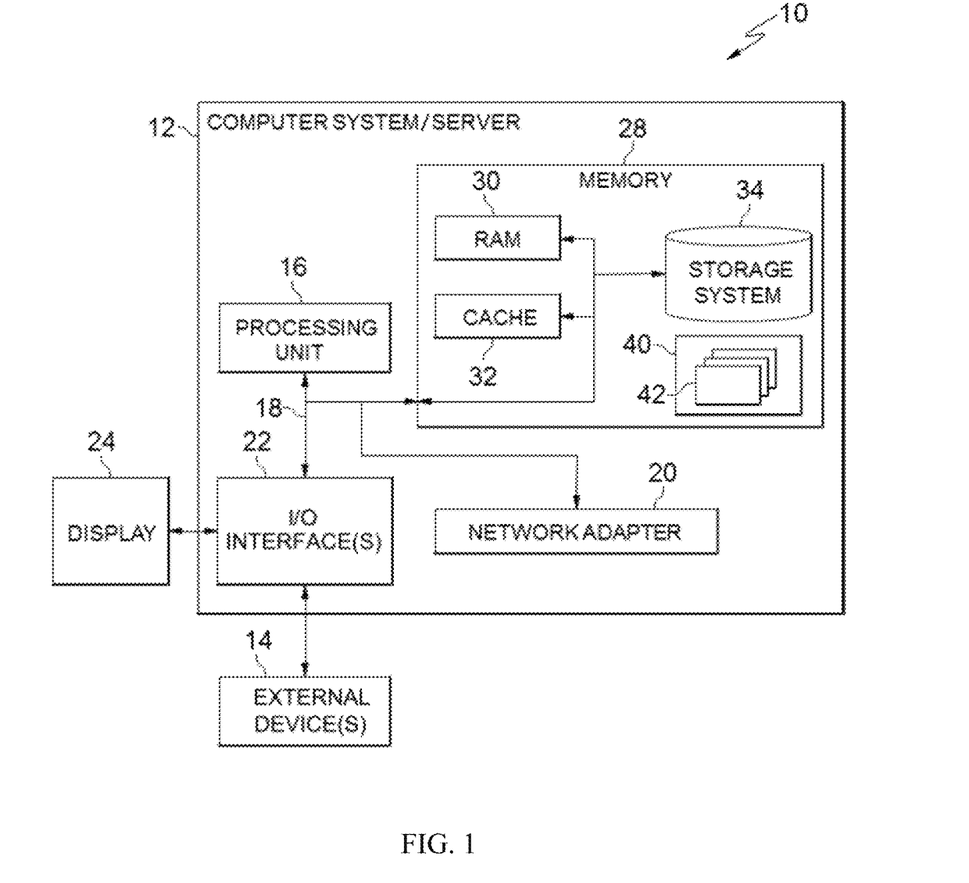
FIG. 1 depicts a cloud computing node according to an embodiment of the present disclosure.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth herein.

In some cloud computing node 10 embodiments, there is a computer system/server 12 or a portable electronic device, such as a communication device, which may be operational with numerous other general purpose or special purpose computing system environments or configurations. Examples of computing systems, environments, and/or configurations that may be suitable for use with computer system/server 12 include, but are not limited to: personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments, where tasks may be performed by remote processing devices that are linked through a communications network. In a distributed cloud computing environment, program modules may be located in both local and remote computer system storage media including memory storage devices.

As shown in FIG. 1, computer system/server 12 in cloud computing node 10 may be the form of a general-purpose computing device. The components of computer system/server 12 may include, but are not limited to: one or more processors (or processing units) 16, a system memory 28, and a bus 18 that couples various system components including system memory 28 to processor 16.

Bus 18 represents one or more of any of several types of bus structures, such as a memory bus or memory controller, a peripheral bus, an accelerated graphics port, and a processor or local bus using any of a variety of bus architectures. By way of example, and not limitation, such architectures include: Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and may include both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk, such as a CD-ROM, DVD-ROM or other optical media, can be provided. In such instances, each may be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14, such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 may communicate with one or more networks such as a local area network (LAN), a general wide area network (WAN), and/or a public network (e.g., the Internet) via network adapter 20. As depicted, network adapter 20 may communicate with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
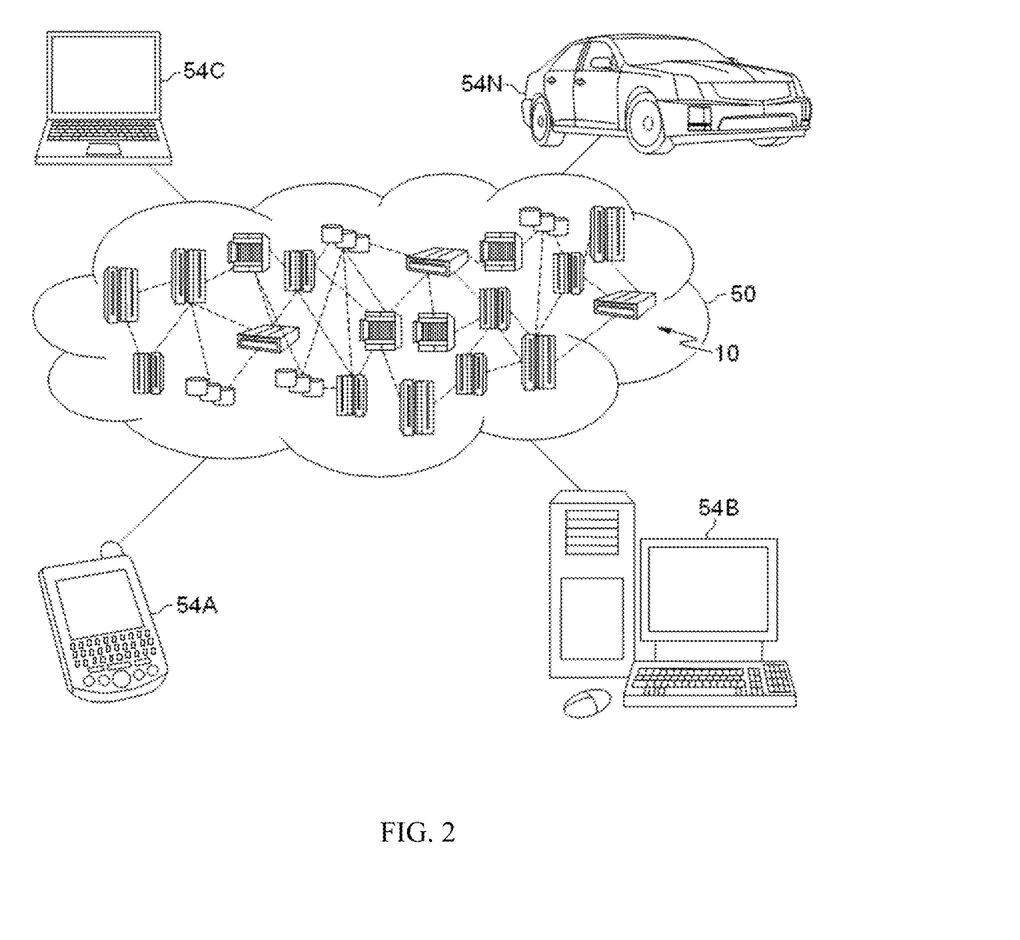
FIG. 2 depicts a cloud computing environment according to an embodiment of the present disclosure.

Referring now to FIG. 2, illustrative cloud computing environment 50 is depicted. As shown, cloud computing environment 50 may include one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein, or a combination thereof. This may allow cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser) in some embodiments.

Figure 3:
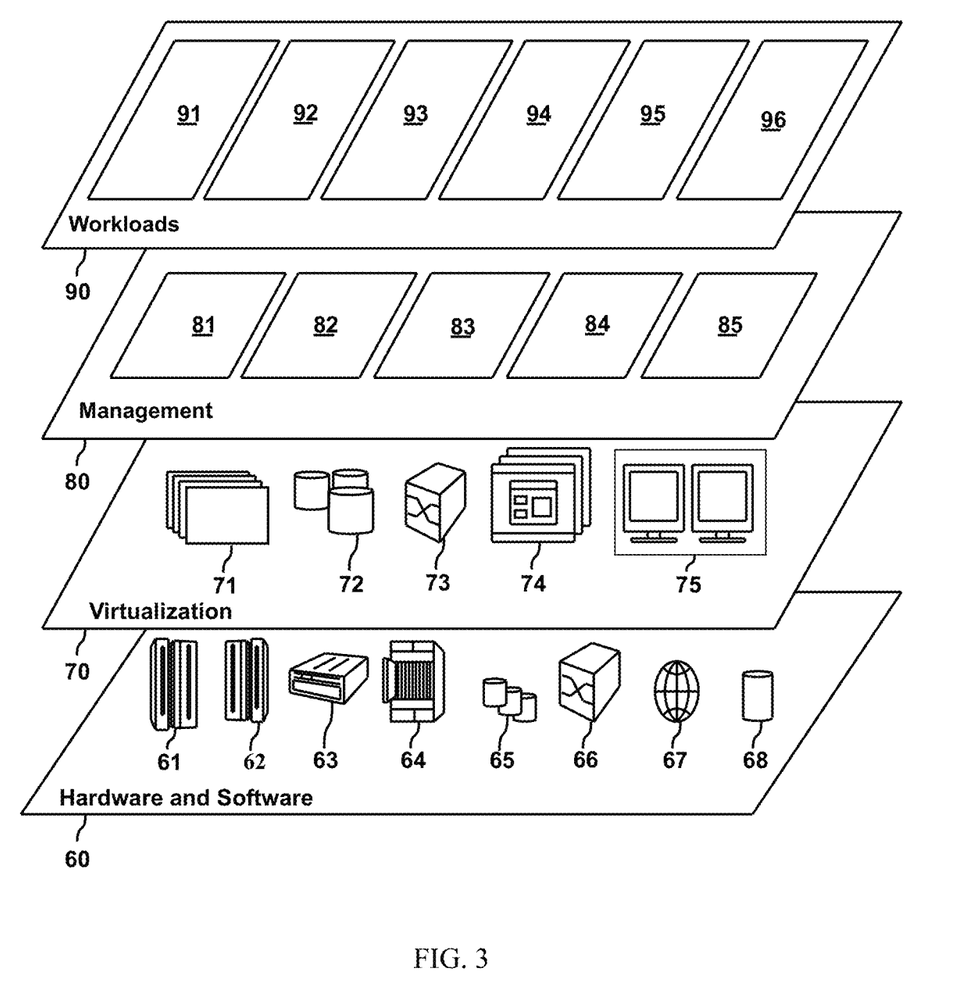
FIG. 3 depicts abstraction model layers according to an embodiment of the present disclosure.

Referring now to FIG. 3, a set of functional abstraction layers provided by some cloud computing environment 50 embodiments (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 may include hardware and software components. Examples of hardware components include, without limitation: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 may provide an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 may provide dynamic procurement of computing resources and other resources that are utilized to perform tasks within the cloud computing environment. Metering and Pricing 82 may provide cost tracking as resources are utilized within the cloud computing environment, and billing or invoicing for consumption of these resources. In one example, these resources may include application software licenses. Security may provide identity verification for cloud consumers and tasks, as well as protection for data and other resources. User portal 83 may provide access to the cloud computing environment for consumers and system administrators. Service level management 84 may provide cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 may provide examples of functionality for which the cloud computing environment may be utilized. Examples of workloads and functions which may be provided from this layer include, without limitation: mapping and navigation 91; software development and lifecycle management 92; virtual classroom education delivery 93; data analytics processing 94; transaction processing 95; and model exploration 96.

As described in the above, the predictive models may be listed in tables for users to view and use. However, such an approach may become difficult and inefficient when the number of models for selecting gets extremely large. Moreover, such an approach may lose many useful insights about models.

In order to solve at least one of the technical problems described above, some embodiments of the present disclosure propose a method, system and computer program product for exploring models based on feature importance, and the feature importance can be used as a metric to measure the degree of such influence and can provide important insights of models and data for model exploration. Therefore, it is possible to use feature importance to determine which features are more important via feature importance, which can help select a more suitable model for a data case of interest. For models used to perform prediction for data cases, for example, decision tree models, they can score the data cases to be predicted according to the features of the data cases, and different features may have different influence on the scoring results of models.

In the model exploration according to some embodiments of the present disclosure, feature importance of a model can be obtained as model feature importance, and feature importance for a data case can be obtained as data feature importance. On this basis, a plurality of models may be clustered according to model feature importance. Further, a model or a cluster of models that is most suitable for the data case may be selected based on a comparison between the model feature importance and the data feature importance. In addition, some embodiments of the present disclosure may also involve presentation of the model feature importance of the plurality of models by box-plot or confidence interval, thereby providing rich information for model exploration.

Figure 4:
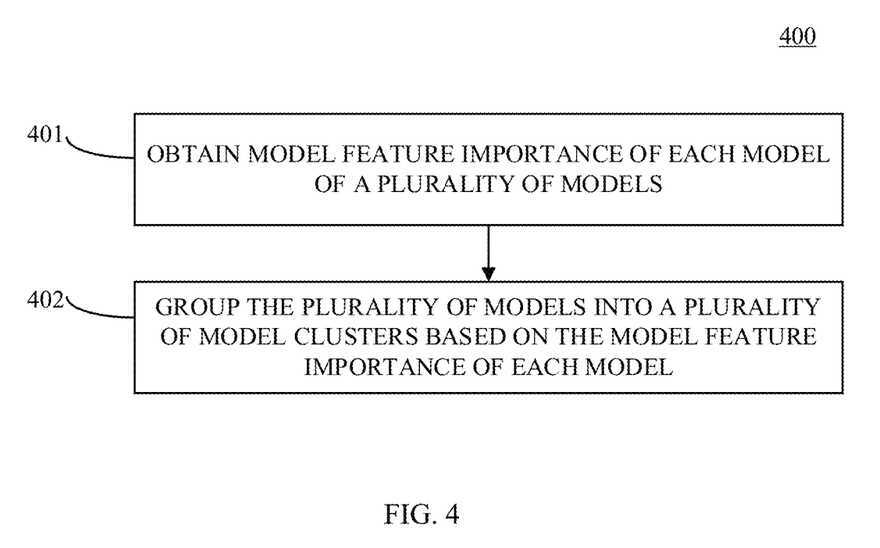
FIG. 4 depicts a flowchart of a method for model exploration according to an embodiment of the present disclosure.

FIG. 4 shows a flowchart of a computer-implemented method 400 for model exploration according to an embodiment of the present disclosure. The method 400 may be executed in any of the environments described in FIGS. 1-3 according to the present disclosure. For example, each operation in method 400 can be performed by one or more processing units in a system for model exploration, such as central processing unit (CPU), and one embodiment of a detailed structure of the system for model exploration will be described later with reference to FIG. 8.

With reference now to FIG. 4, method 400 may comprise operations 401 and 402. At operation 401, model feature importance of each model of a plurality of models may be obtained. In this embodiment, model feature importance generally refers to a set of importance values of all (or substantially all) related features in a model, where the importance of each feature can be quantified as a numerical value. There can be various ways to obtain the model feature importance of a model. For example, with respect to some commonly used models, the model feature importance may be available together with the models, which means the model feature importance can be obtained simply from the description of the model. Alternatively, the model feature importance may also be obtained by using several exiting algorithms, such as variable importance, sensitivity analysis, or any other type of algorithms for computing model feature importance.

At operation 402, the plurality of models may be grouped into a plurality of model clusters based on the respective model feature importance of each model. For illustrative purposes, FIG. 5 provides an example of model feature importance and the grouping of a plurality of model clusters based on the model feature importance.

Figure 5:
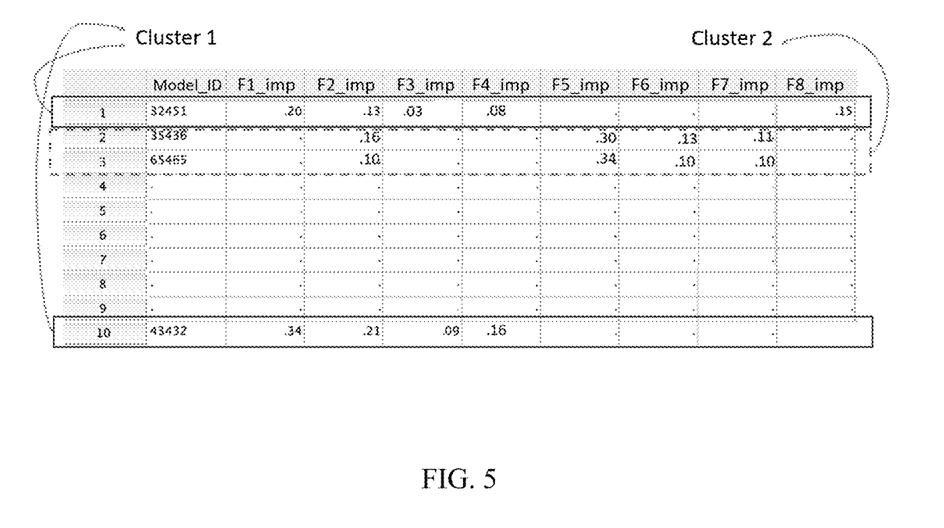
FIG. 5 depicts an example of model feature importance and the grouping of a plurality of model clusters based on the model feature importance according to an embodiment of the present disclosure.

With reference now to FIG. 5, the table illustratively shows model feature importance of four different models. The model feature importance of each model in this example comprises importance values of all related features used by each model. In this table, item "Model_ID" may be used to distinguish different models, that is, different models have their respective "Model_ID" (i.e., 32451, 35436, 65465 and 43432 as shown in the table), and items "F1_imp", "F2_imp", . . . , "F8_imp" may represent eight features involved in the models listed in the table, and the importance value of each feature for each model is filled in the corresponding blank of the table. While four models and eight features are listed in the table as examples, a greater or fewer number of models, features, and corresponding importance values may be used as appropriate.

On a basis of obtaining the model feature importance of each model of a plurality of models, grouping of the plurality of models may be performed based on the obtained model feature importance. For example, clustering may be performed, by using several clustering algorithms such as k-means based algorithms (e.g., traditional k-means, k-means++ or bi-kmeans algorithms), on the plurality of models with the importance values of the features as a sample set to be clustered, to group the plurality of models into a plurality of model clusters. In this way, models within same cluster may have similar model feature importance, and on the other hand, models belonging to different clusters may have dissimilar model feature importance.

Continuing the illustrative example depicted in FIG. 5, the first model (with Model_ID: 32451) and the tenth model (with Model_ID: 43432) may be grouped into the same cluster (Cluster 1) because features "F1_imp", "F2_imp", "F3_imp", and "F4_imp" in both models have relatively large importance values. The second model (with Model_ID: 35436) and the third model (with Model_ID: 65465) may be grouped into the same cluster (Cluster 2) because features "F2_imp", "F5_imp", "F6_imp", and "F7_imp" in both models have relatively large importance values.

Further, according to some embodiments of the present disclosure, the model feature importance may be presented in a visual way, for example, by box-plot or confidence interval. For illustrative purposes, FIGS. 6A-6B provides examples of the presenting of model feature importance.

Figure 6A:
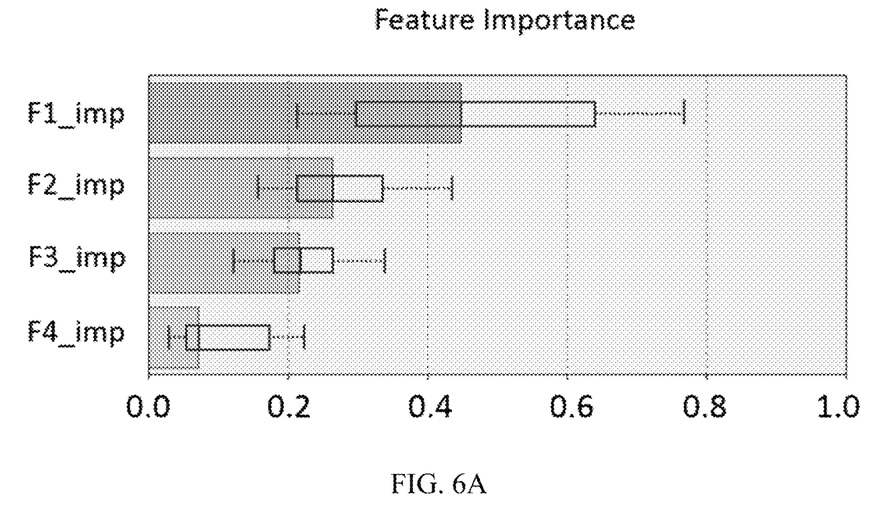
FIGS. 6A-6B depicts examples of the presenting of model feature importance according to an embodiment of the present disclosure.

With reference now to FIG. 6A, an example graph embodiment presenting model feature importance of a plurality of models by box-plot is depicted, in which the vertical axis of the graph represents features of interest of the models, and the horizontal axis of the graph represents the importance value of these features. The features of interest listed in the vertical axis in this example can be all features of the models, or part of the features. For example, a predetermined number of (such as 4 in this example) features with the highest median importance values, or features with their importance values above a predetermined threshold can be selected as the features of interest. In this example graph, the importance values of each feature for all the plurality of models are presented by box-plot including data nodes such as the minimum, the maximum, the median, and the first and third quartiles. In this way, some statistical values of each feature's importance values for all of the plurality of models can be presented. The data nodes of the box-plot can be modified as needed to present desired statistics on feature importance. With such a presentation, the user can easily comprehend which features are important among an extremely large number of models.

Figure 6B:
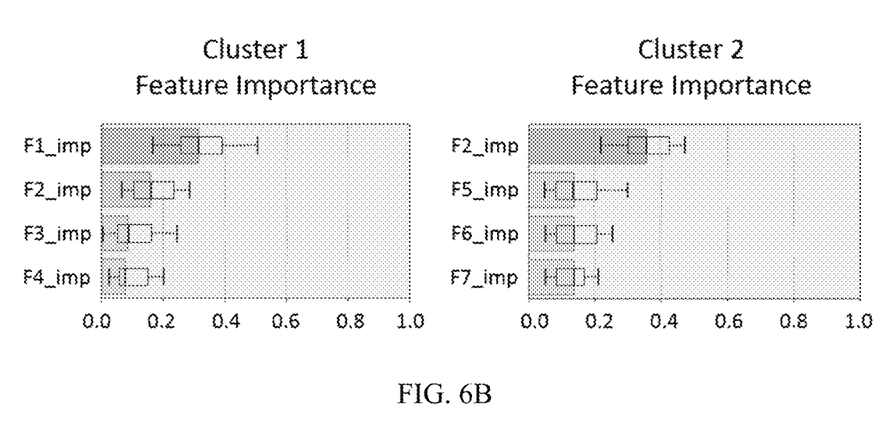

With reference now to FIG. 6B, example graphs respectively presenting model feature importance of models included in different model clusters are depicted. The left graph presents model feature importance of models in Cluster 1 by box-plot, and the right graph presents model feature importance of models in Cluster 2 by box-plot. As can be seen from the graphs, for different model clusters, the features shown in the corresponding graphs may be different because models belonging to different model clusters may have different features with relatively high importance values, as described above with reference to FIG. 5. In this way, the user can intuitively comprehend which features are important for each model cluster.

In some embodiments, the model feature importance of all the plurality of models or the model(s) in each cluster may be also presented by a confidence interval.

As described in the above, massive sets of predictive models (e.g., often greater than about 10,000 models) may be grouped into a plurality of model clusters based on model feature importance of the models. Therefore, models that may be suited to the same data cases are clustered, which facilitates model exploration by users. Furthermore, the model feature importance may be shown visually by box-plot or confidence interval to present which features are relatively important to the plurality of models or each model cluster, such that the users can select a suitable model or model cluster based on the insights gained from the presentation.

Figure 7:
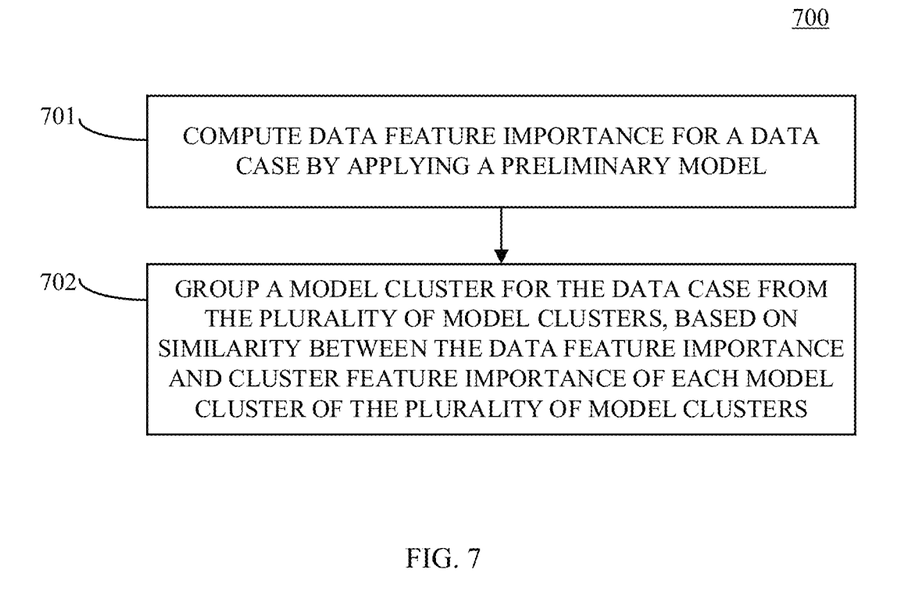
FIG. 7 depicts a flowchart of a method for model exploration according to another embodiment of the present disclosure.

FIG. 7 shows a flowchart of a method 700 for model exploration according to another embodiment of the present disclosure. Method 700 may be used to select a model cluster for the data case from the plurality of model clusters after the plurality of models are grouped into model clusters. Method 700 may be performed after method 400 shown in FIG. 4, and may be executed in any of the environments described in FIGS. 1-3 according to the present disclosure. For example, each operation of method 700 may be performed by one or more processing units in a system for model exploration, such as central processing unit (CPU), and detailed structure of one embodiment of a system for model exploration will be described later with reference to FIG. 8.

With reference to FIG. 7, method 700 can comprise operations 701 and 702. At operation 701, data feature importance for a data case may be computed by applying a preliminary model. The data feature importance may be computed by performing a model interpretation algorithm, such as LIME (Local Interpretable Model-Agnostic Explanations) or SHAP (SHapley Additive exPlanations), on the preliminary model to deduce importance values for the features of the data case. In one embodiment of the present disclosure, the preliminary model may be selected based on at least one of model attributes from the plurality of models to be explored. The model attributes may, for example, comprise model performance, model size, model accuracy, and model complexity. For example, the preliminary model may be selected based on model accuracy and/or model complexity from the plurality of models. In such an example, the model selected as the preliminary model preferably has high accuracy and/or low complexity.

At operation 702, a model cluster for the data case may be selected from the plurality of model clusters based on similarity between the data feature importance and cluster feature importance of each model cluster of the plurality of model clusters. The cluster feature importance of each model cluster generally represents feature importance of the corresponding cluster, and may be derived from the model feature importance of at least one model included in the corresponding model cluster. For example, in one embodiment according to the present disclosure, the cluster feature importance may consist of the median of feature importance values of each feature in the model feature importance of all or part of models included in the corresponding model cluster, as shown in FIG. 6B. Alternatively, the cluster feature importance may be a set of any other values representing the overall feature importance of the corresponding model cluster, such as the average, the minimum, the maximum, and the first or third quartile of feature importance values of each feature in the model feature importance of all or part of models included in the corresponding model cluster.

The similarity between the data feature importance and the cluster feature importance of each model cluster of the plurality of model clusters may be computed by various ways. In one embodiment of the present disclosure, a variance between the data feature importance and the cluster feature importance may be computed as a value indicating the similarity, where the smaller the variance, the more similar the data feature importance and cluster feature importance. Therefore, a model cluster corresponding to the minimum variance may be selected from the plurality of model clusters as a model cluster for the data case. Alternatively, the similarity may be computed in other suitable ways, such as by Euclidean distance, Chebyshev distance, Mahalanobis distance, etc.

According to some embodiments of the present disclosure, after selecting a model cluster for the data case at operation 702, a model for scoring the data case may be further selected from the selected model cluster. In some embodiments, the selection of the model for scoring the data case may be based on at least one criteria such as model type, model size, model accuracy, and model performance. Alternatively, the selection of the model for scoring the data case may be based on similarity between the data feature importance and the model feature importance of each model included in the selected model cluster. The similarity can be also determined by, for example, computing a variance between the data feature importance and the model feature importance of each model included in the selected model cluster. Alternatively, the similarity may be computed in any other suitable way, such as by Euclidean distance, Chebyshev distance, Mahalanobis distance, etc.

According to embodiments of the present disclosure, an efficient way for model exploration is provided, by which massive sets of predictive models (e.g., >about 10,000) may be grouped into multiple model clusters based on model feature importance, so that the models within each model cluster may be more suitable to specific data cases, which may facilitate managing the models and selecting a suitable model for a given data case. Further, the model feature importance may be presented in a more intuitive way, and thus users can gain many useful insights from the presentation of feature importance, enabling more accurate and efficient model exploration.

Figure 8:
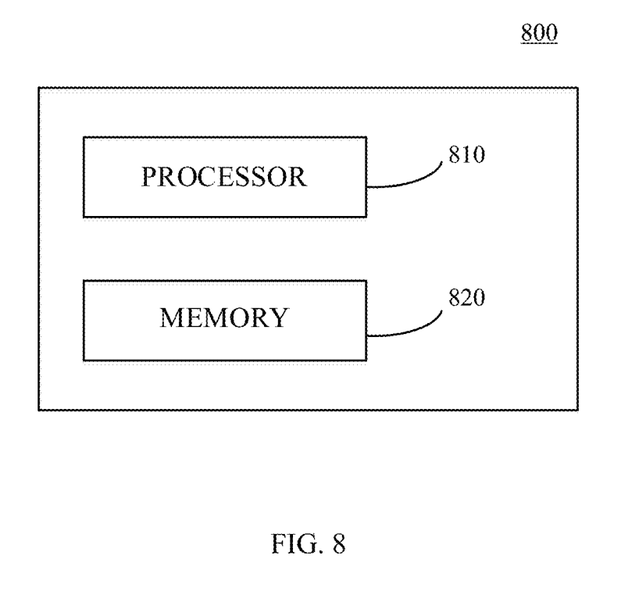
FIG. 8 depicts a system for model exploration according to an embodiment of the present disclosure.

Referring now to FIG. 8, there is shown an example system 800 for model exploration according to an embodiment of the present disclosure. The system 800 for model exploration may comprise one or more processors 810 and a memory 820 coupled to at least one of the processors 810. A set of computer program instructions may be stored in the memory 820. When executed by at least one of the processors 810, the set of computer program instructions perform a computer-implemented method for model exploration, which may comprise following series of operations: obtaining model feature importance of each model of a plurality of models, and grouping the plurality of models into a plurality of model clusters based on the model feature importance of each model.

In one embodiment according to the present disclosure, the computer-implemented method for model exploration further may comprise following series of operations: computing data feature importance for a data case by applying a preliminary model, and selecting a model cluster for the data case from the plurality of model clusters, based on similarity between the data feature importance and cluster feature importance of each model cluster of the plurality of model clusters, wherein the cluster feature importance of each model cluster is derived from the model feature importance of at least one model included in corresponding model cluster, and the preliminary model is selected based on model accuracy and/or model complexity from the plurality of models.

In one embodiment according to the present disclosure, the selecting a model cluster for the data case from the plurality of model clusters, based on similarity between the data feature importance and cluster feature importance of each model cluster of the plurality of model clusters further may comprise the following series of operations: computing a variance between the data feature importance and the cluster feature importance, and selecting a model cluster corresponding to the minimum variance.

In one embodiment according to the present disclosure, after selecting a model cluster for the data case, the computer-implemented method for model exploration may further comprise selecting a model for scoring the data case from the selected model cluster. According to one embodiment of the present disclosure, the selection of the model for scoring the data case may be based on at least one criteria, such as model type, model size, model accuracy and model performance. Alternatively, the selection of the model for scoring the data case may be based on similarity between the data feature importance and the model feature importance of each model included in the selected model cluster, and the similarity can be also measured by, for example, computing a variance or various vector distance based methods distance between the data feature importance and the model feature importance of each model included in the selected model cluster, as mentioned above.

In one embodiment according to the present disclosure, the computer-implemented method for model exploration may further comprise: presenting, on a computer display, the model feature importance of all of the plurality of models by box-plot or confidence interval, and/or the model feature importance of all model(s) included in each model cluster of the plurality of model clusters by box-plot or confidence interval.

It should be noted that descriptions above related to the process of method 400 or method 700 may be applied to system 800, and details are omitted herein for conciseness.

In addition, according to another embodiment of the present disclosure, a computer program product for feature processing is disclosed. As an example, the computer program product may comprise a non-transitory computer readable storage medium having program instructions embodied therewith, and the program instructions are executable by a processor. When executed, the program instructions cause the processor to perform one or more of the above described procedures, and details are omitted herein for conciseness.

It should be noted that the processing of method for model exploration or achieved by the system for model exploration as described herein according to embodiments of this disclosure may be implemented by computer system/server 12 of FIG. 1.

Embodiments of the present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise, for example, copper transmission cables, optical transmission fibers, wireless transmission, routers, firewalls, switches, gateway computers, and/or edge servers. A network adapter card or network interface in each computing/processing device may receive computer readable program instructions from the network and forwards the computer readable program instructions for storage in a computer readable storage medium within the respective computing/processing device.

Computer readable program instructions for carrying out operations of the present disclosure may be, for example, assembler instructions, instruction-set-architecture (ISA) instructions, machine instructions, machine dependent instructions, microcode, firmware instructions, state-setting data, configuration data for integrated circuitry, and/or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including without limitation, a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), and/or programmable logic arrays (PLA) may execute some or all of the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one operation, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for exploring predictive models, the method comprising:
computing feature importance for each of a plurality of features for each of a plurality of predictive models;
clustering predictive models among the plurality of predictive models to form a plurality of model clusters based on a similarity of feature importance of the computed feature importance for each of the plurality of features for each of the plurality of predictive models;
deriving a cluster feature importance for each model cluster of the plurality of model clusters;
computing a feature importance for a data case using a preliminary model;
selecting a model cluster for the data case from the plurality of model clusters based on similarity between the feature importance for the data case and the cluster feature importance of each model cluster of the plurality of model clusters; and
selecting a predictive model within the selected model cluster to score the data case based on at least one criteria thereby optimizing an evaluation of the plurality of predictive models among a massive set of predictive models.

2. The computer-implemented method of claim 1, wherein the preliminary model is selected based on at least one of a plurality of model attributes from the plurality of predictive models to be explored.

3. The computer-implemented method of claim 2, wherein the plurality of model attributes comprise model performance, model size, model accuracy, and model complexity.

4. The computer-implemented method of claim 1, further comprising:
performing a model interpretation algorithm on the preliminary model to deduce importance values for features of the data case to compute the feature importance for the data case using the preliminary model.

5. The computer-implemented method of claim 1, wherein the feature importance is computed for each of the plurality of predictive models using sensitivity analysis.

6. The computer-implemented method of claim 1, wherein the computed feature importance for each of the plurality of features for each of the plurality of predictive models is displayed via a box-plot or a confidence interval to show a distribution of feature importance among the plurality of predictive models.

7. The computer-implemented method of claim 1, wherein the at least one criteria comprises one or more of the following in the group consisting of a model type, a model size, a model accuracy, and a model performance.

8. The computer-implemented method of claim 1, further comprising:
clustering predictive models among the plurality of predictive models to form the plurality of model clusters using a k-means based algorithm.

9. The computer-implemented method of claim 1, wherein the similarity between the feature importance for the data case and the cluster feature importance of each model cluster of the plurality of model clusters is computed via a measured distance between vectors.

10. A computer program product for exploring predictive models, the computer program product comprising one or more computer readable storage mediums having program code embodied therewith, the program code comprising programming instructions for:
computing feature importance for each of a plurality of features for each of a plurality of predictive models;
clustering predictive models among the plurality of predictive models to form a plurality of model clusters based on a similarity of feature importance of the computed feature importance for each of the plurality of features for each of the plurality of predictive models;
deriving a cluster feature importance for each model cluster of the plurality of model clusters;
computing a feature importance for a data case using a preliminary model;
selecting a model cluster for the data case from the plurality of model clusters based on similarity between the feature importance for the data case and the cluster feature importance of each model cluster of the plurality of model clusters; and
selecting a predictive model within the selected model cluster to score the data case based on at least one criteria thereby optimizing an evaluation of the plurality of predictive models among a massive set of predictive models.

11. The computer program product of claim 10, wherein the preliminary model is selected based on at least one of a plurality of model attributes from the plurality of predictive models to be explored.

12. The computer program product of claim 11, wherein the plurality of model attributes comprise model performance, model size, model accuracy, and model complexity.

13. The computer program product of claim 10, wherein the program code further comprises the programming instructions for:
performing a model interpretation algorithm on the preliminary model to deduce importance values for features of the data case to compute the feature importance for the data case using the preliminary model.

14. The computer program product of claim 10, wherein the feature importance is computed for each of the plurality of predictive models using sensitivity analysis.

15. The computer program product of claim 10, wherein the computed feature importance for each of the plurality of features for each of the plurality of predictive models is displayed via a box-plot or a confidence interval to show a distribution of feature importance among the plurality of predictive models.

16. The computer program product of claim 10, wherein the at least one criteria comprises one or more of the following in the group consisting of a model type, a model size, a model accuracy, and a model performance.

17. The computer program product of claim 10, wherein the program code further comprises the programming instructions for:
clustering predictive models among the plurality of predictive models to form the plurality of model clusters using a k-means based algorithm.

18. The computer program product of claim 10, wherein the similarity between the feature importance for the data case and the cluster feature importance of each model cluster of the plurality of model clusters is computed via a measured distance between vectors.

19. A system, comprising:
a memory for storing a computer program for exploring predictive models; and
a processor connected to the memory, wherein the processor is configured to execute program instructions of the computer program comprising:
computing feature importance for each of a plurality of features for each of a plurality of predictive models;
clustering predictive models among the plurality of predictive models to form a plurality of model clusters based on a similarity of feature importance of the computed feature importance for each of the plurality of features for each of the plurality of predictive models;
deriving a cluster feature importance for each model cluster of the plurality of model clusters;
computing a feature importance for a data case using a preliminary model;
selecting a model cluster for the data case from the plurality of model clusters based on similarity between the feature importance for the data case and the cluster feature importance of each model cluster of the plurality of model clusters; and
selecting a predictive model within the selected model cluster to score the data case based on at least one criteria thereby optimizing an evaluation of the plurality of predictive models among a massive set of predictive models.

20. The system of claim 19, wherein the preliminary model is selected based on at least one of a plurality of model attributes from the plurality of predictive models to be explored.

21. The system of claim 20, wherein the plurality of model attributes comprise model performance, model size, model accuracy, and model complexity.

22. The system of claim 19, wherein the program instructions of the computer program further comprise:
performing a model interpretation algorithm on the preliminary model to deduce importance values for features of the data case to compute the feature importance for the data case using the preliminary model.

23. The system of claim 19, wherein the feature importance is computed for each of the plurality of predictive models using sensitivity analysis.

24. The system of claim 19, wherein the computed feature importance for each of the plurality of features for each of the plurality of predictive models is displayed via a box-plot or a confidence interval to show a distribution of feature importance among the plurality of predictive models.

25. The system of claim 19, wherein the at least one criteria comprises one or more of the following in the group consisting of a model type, a model size, a model accuracy, and a model performance.

* * * * *